UNITED STATES PATENT OFFICE 2,271,872

PRODUCTION OF GROWTH PROMOTING SUBSTANCES

Herschel K. Mitchell, Austin, Tex., assignor to Research Corporation, New York, N. Y., a corporation of New York No Drawing. Application March 25, 1940, Serial No. 325,839

6 Claims. (Cl. 260—534)

This invention relates to the production of substances useful for the growth of plants and micro-organism and believed to be necessary for the proper nutrition of animals. Pantothenic acid, a substance which promotes the growth of diverse organisms is believed to have a structure corresponding to the following formula:

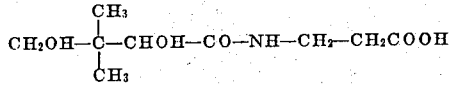

However, I have found that certain compounds with the same skeleton structure but containing more hydroxyl groups, are also valuable as growth promoting agents and function similarly to the synthetic pantothenic acid formulated above.

As an example of the production and use of such a growth promoting substance I cite the following experiments.

Twenty grams of propionaldehyde were added dropwise to a cooled mixture of 55 grams of 38% formaldehyde and 30 grams of potassium carbonate. After three days shaking the solution was extracted repeatedly with ether. The sixteen grams of viscous aldehyde obtained was dissolved in 20 ml. of ether followed by addition of 10 ml. of liquid hydrogen cyanide and one drop of triethyl amine all in an ice bath. After standing over night the mixture was treated with 50 ml. of 6 N hydrochloric acid on the steam bath for four hours. The material was then made strongly alkaline with sodium hydroxide, then extracted twice with ether and the extract discarded. The water solution was made to pH L with concentrated hydrochloric acid and heated on the steam bath for five hours. The resulting product was extracted twice with ether discarding the extract which contained very little lactone. The solution was then extracted continuously for 24 hours with ether. Evaporation of the ether gave a viscous liquid soluble in water and alcohol. Heating the crude lactone with 0.05 N sodium hydroxide showed it to be at least 95% lactone and to have a saponification equivalent of 143. The theoretical for the compound

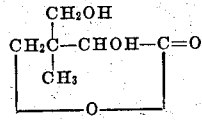

is 146.

A sample of this lactone (2.8 mgs.) was heated with 10 mgs. of β alanine methyl ester at 70° C. for one hour. The resulting product was treated with 0.1 ml. of 1 N potassium hydroxide in absolute methanol to remove the ester group and give the compound in racemic form:

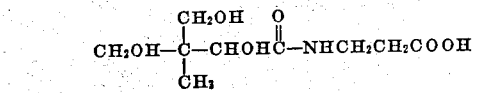

The growth promoting activity of this product was shown by the fact that in three tests the reaction product from 0.5 gamma, 1.0 gamma and 3 gamma of lactone yielded 0.3, 0.8, and 1.5 mg. units (Weinstock, Mitchell, Pratt and Williams Journ. Am. Chem. Soc. 61, 1421, 1939) of pantothenic acid activity as measured by a modification of the L. casei test of Snell, Peterson and Strong. Journ. Am. Chem. Soc. 60, 2825 (1938). Control tests in which β alanine ester alone was used, gave no growth stimulation.

The α hydroxy γ lactone with two other free hydroxyl groups, viz. -

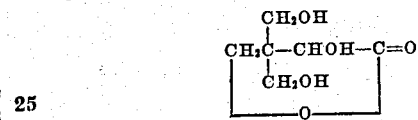

can be prepared by interaction between acetaldehyde and formaldehyde followed by cyanohydrin synthesis and hydrolysis as described above. This when condensed with β alanine ester and subsequently hydrolyzed yields the product:

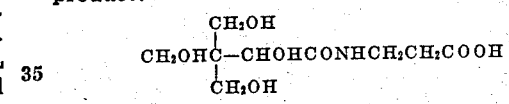

The above are cited as examples only and the invention is not limited to the specific cases cited.

I claim:

1. A growth promoting substance having the structure represented by the formula:

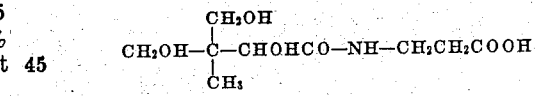

2. A process of producing a growth promoting substance by condensing the lactone

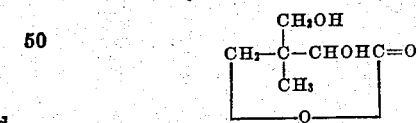

with beta alanine ester and subsequent hydrolysis of the ester linkage.

3. A growth promoting substance having the structure represented by the formula:

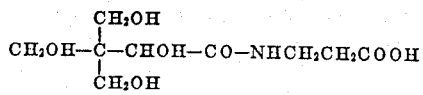

4. A process of producing a growth promoting substance by condensing the lactone:

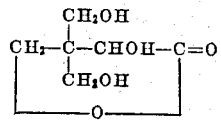

with a beta-alanine ester and hydrolysing the ester linkage.

5. The process which comprises reacting a β-alanine ester with a lactone of the group having the formulae:

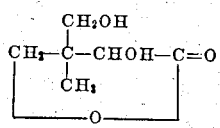

and

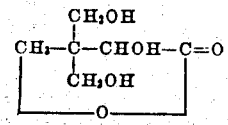

6. The process which comprises reacting a β-alanine ester with a lactone of the group having the formulae:

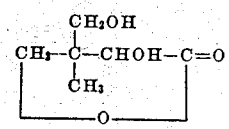

and

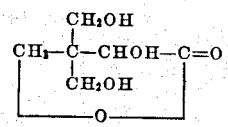

and subsequently cleaving the ester linkage by hydrolysis.

HERSCHEL K. MITCHELL.